United States Patent
Tips (10) Patent No.: US 8,234,932 B2
(45) Date of Patent: Aug. 7, 2012

(54) ANNULUS VORTEX FLOWMETER

(75) Inventor: Timothy R. Tips, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 54 days.

(21) Appl. No.: 12/839,463

(22) Filed: Jul. 20, 2010

(65) Prior Publication Data

US 2011/0030483 A1    Feb. 10, 2011

(51) Int. Cl.
G01F 1/32 (2006.01)
(52) U.S. Cl. .................................................. 73/861.24
(58) Field of Classification Search .......... 73/861.24, 73/861.21, 861.22, 152, 47; 166/254.1, 250.15
See application file for complete search history.

(56) References Cited

U.S. PATENT DOCUMENTS

| | | | |
|---|---|---|---|
| 2,379,138 A | 6/1945 | Fitting, Jr. et al. | |
| 2,895,063 A | 7/1959 | Morris | |
| 2,960,109 A | 11/1960 | Wilson | |
| 3,315,755 A | 4/1967 | Brooks | |
| 3,342,267 A | 9/1967 | Cotter et al. | |
| 3,398,302 A | 8/1968 | Harnau et al. | |
| 3,448,305 A | 6/1969 | Raynal et al. | |
| 3,506,076 A | 4/1970 | Angona | |
| 3,558,936 A | 1/1971 | Horan | |
| 3,766,399 A | 10/1973 | Demetrescu | |
| 3,772,541 A | 11/1973 | Campagnuolo et al. | |
| 3,927,564 A | 12/1975 | Ketelsen | |
| 3,968,387 A | 7/1976 | Scarff | |
| 3,970,877 A | 7/1976 | Russell et al. | |
| 4,047,832 A | 9/1977 | Sforza | |
| 4,158,368 A | 6/1979 | Clark | |
| 4,246,765 A | 1/1981 | Zabcik | |
| 4,362,106 A | 12/1982 | Campagnuolo et al. | |
| 4,380,935 A * | 4/1983 | Sgourakes et al. | 73/861.24 |
| 4,387,318 A | 6/1983 | Kolm et al. | |
| 4,457,181 A | 7/1984 | Marsh | |
| 4,464,939 A | 8/1984 | Corpron | |

(Continued)

FOREIGN PATENT DOCUMENTS

FR    2626729 A1    2/1988

(Continued)

OTHER PUBLICATIONS

Office Action issued Feb. 23, 2006, for U.S. Appl. No. 10/658,899, 6 pages.

(Continued)

*Primary Examiner* — Jewel V Thompson
(74) *Attorney, Agent, or Firm* — Smith IP Services, P.C.

(57) ABSTRACT

An annulus vortex flowmeter for use in conjunction with a subterranean well. A flowmeter includes a housing, a vortex responsive structure which vibrates in response to vortices produced external to the housing and a sensor which senses vibration of the structure and produces a signal indicative of a flow rate. A method of measuring fluid flow rate between a tubular string and a zone intersected by a wellbore includes utilizing a flowmeter having a vortex shedding device external to a housing for interconnection in the tubular string, the flowmeter including a vortex responsive structure which vibrates in response to vortices produced by the vortex shedding device as the fluid flows through an annulus external to the housing, and a sensor which senses vibration of the structure and produces a signal indicative of the rate of flow of the fluid; and determining the flow rate based on the sensor signal.

24 Claims, 4 Drawing Sheets

U.S. PATENT DOCUMENTS

| | | | |
|---|---|---|---|
| 4,467,236 | A | 8/1984 | Kolm et al. |
| 4,491,738 | A | 1/1985 | Kamp |
| 4,518,888 | A | 5/1985 | Zabcik |
| 4,536,674 | A | 8/1985 | Schmidt |
| 4,627,294 | A | 12/1986 | Lew |
| 4,669,068 | A | 5/1987 | Klatt |
| 4,716,770 | A | 1/1988 | Herzog |
| 4,769,569 | A | 9/1988 | Stahlhuth |
| 4,772,813 | A | 9/1988 | Mohri et al. |
| 4,808,874 | A | 2/1989 | Stahlhuth |
| 4,879,909 | A * | 11/1989 | Lew ............................ 73/861.24 |
| 5,289,726 | A | 3/1994 | Miau et al. |
| 5,295,397 | A | 3/1994 | Hall et al. |
| 5,317,223 | A | 5/1994 | Kiesewetter et al. |
| 5,351,559 | A | 10/1994 | Miau et al. |
| 5,547,029 | A | 8/1996 | Rubbo et al. |
| 5,554,922 | A | 9/1996 | Kunkel |
| 5,626,200 | A | 5/1997 | Gilbert et al. |
| 5,703,474 | A | 12/1997 | Smalser |
| 5,801,475 | A | 9/1998 | Kimura |
| 5,808,209 | A | 9/1998 | Zielinska et al. |
| 5,839,508 | A | 11/1998 | Tubel et al. |
| 5,896,076 | A | 4/1999 | Van Namen |
| 5,899,664 | A | 5/1999 | Lawrence |
| 5,907,211 | A | 5/1999 | Hall et al. |
| 5,965,964 | A | 10/1999 | Skinner et al. |
| 5,979,558 | A | 11/1999 | Bouldin et al. |
| 5,982,708 | A | 11/1999 | Pearce |
| 5,995,020 | A | 11/1999 | Owens et al. |
| 6,011,346 | A | 1/2000 | Buchanan et al. |
| 6,020,653 | A | 2/2000 | Woodbridge et al. |
| 6,179,052 | B1 | 1/2001 | Purkis et al. |
| 6,217,284 | B1 | 4/2001 | Lawrence |
| 6,314,821 | B1 | 11/2001 | Allan |
| 6,351,999 | B1 | 3/2002 | Maul et al. |
| 6,424,079 | B1 | 7/2002 | Carroll |
| 6,470,970 | B1 | 10/2002 | Purkis et al. |
| 6,504,258 | B2 | 1/2003 | Schultz et al. |
| 6,554,074 | B2 | 4/2003 | Longbottom |
| 6,567,013 | B1 | 5/2003 | Purkis et al. |
| 6,575,237 | B2 | 6/2003 | Purkis et al. |
| 6,585,051 | B2 | 7/2003 | Purkis et al. |
| 6,604,581 | B2 * | 8/2003 | Moake et al. ............ 166/250.07 |
| 6,607,030 | B2 | 8/2003 | Bauer et al. |
| 6,659,184 | B1 | 12/2003 | Tips et al. |
| 6,672,409 | B1 | 1/2004 | Dock et al. |
| 6,840,317 | B2 * | 1/2005 | Hirsch et al. ............ 166/250.15 |
| 6,914,345 | B2 | 7/2005 | Webster |
| 7,047,822 | B2 | 5/2006 | Good et al. |
| 7,119,480 | B2 | 10/2006 | Guy |
| 7,208,845 | B2 | 4/2007 | Masters et al. |
| 7,242,103 | B2 | 7/2007 | Tips |
| 7,487,686 | B2 | 2/2009 | Wang et al. |
| 2002/0096887 | A1 | 7/2002 | Schultz et al. |
| 2005/0051323 | A1 | 3/2005 | Fripp et al. |
| 2005/0230973 | A1 | 10/2005 | Fripp et al. |
| 2006/0064972 | A1 | 3/2006 | Allen |
| 2006/0175052 | A1 | 8/2006 | Tips |
| 2009/0114386 | A1 * | 5/2009 | Hartog et al. ............ 166/250.08 |

FOREIGN PATENT DOCUMENTS

| | | | |
|---|---|---|---|
| GB | 2044822 | A | 10/1980 |
| GB | 2153410 | A | 8/1985 |
| JP | 9163771 | A | 6/1997 |
| WO | 0210553 | A1 | 2/2002 |
| WO | 02057589 | A2 | 7/2002 |

OTHER PUBLICATIONS

Office Action issued Mar. 10, 2006, for U.S. Appl. No. 10/825,350, 19 pages.
John V. Bouyoucos, "Self-Excited Hydrodynamic Oscillators", NR-014-903, technical memorandum, dated Jul. 31, 1955, 329 pages.
PICMA, "Introduction to Piezo Actuators", undated, 2 pages.
Bernard Jaffe, William R. Cook, Jr., and Hans Jaffee, "Piezoelectric Ceramics" Non-Metallic Solids, A series of monographs, dated 1971, 21 pages.
Steven R. Hall and Eric F. Prechtl, "Development of a Piezoelectric Servoflap for Helicopter Rotor Control", dated Sep. 19, 1995, 9 pages.
Technical Papers, "Sediment Management with Submerged Vanes. I: Theory" vol. 117, Issue 3, pp. 267-267, dated Mar. 1991, 1 page.
Seung-Eek Park and Thomas R. Shrout, "Characteristics of Relaxor-Based Piezoelectric Single Crystals for Ultrasonic Transducers", vol. 44, No. 5, dated Sep. 1997, 8 pages.
International Search Report and Written Opinion issued Sep. 23, 2009 for International Application No. PCT/US09/53128, 8 pages.
International Preliminary Report on Patentability issued Feb. 16, 2012 for International Application No. PCT/US09/53128, 7 pages.
Office Action issued Sep. 14, 2005, for U.S. Appl. No. 10/658,899, 11 pages.
Office Action issued Oct. 31, 2005, for U.S. Appl. No. 10/825,350, 9 pages.
Office Action issued Aug. 28, 2006, for U.S. Appl. No. 10/826,952, 10 pages.
Examination Report issued Mar. 17, 2006, for GB Patent Application Serial No. 0419933.7, 2 pages.
Search Report issued Jan. 17, 2005, for GB Patent Application Serial No. 0419933.7, 1 page.
Geoffrey Parkinson, Phenomena and Modelling of Flow-Induced Vibrations of Bluff Bodies, Prog. Aerospace Sci. vol. 26, pp. 169-224, dated 1989, 29 pages.
ETREMA, Active Machining Systems, Picton Profile and Ovality Turning, AMS product brochure, undated, 2 pages.
NASA Tech Briefs, Extracting Energy from Natural Flow, dated Spring 1980, 1 page.
Robert D. Blevins, Flow-Induced Vibration, dated 1977, 45 pages.
Frank M. White, Fluid Mechanics, Second Edition, dated 1986, 1979, McGraw-Hill, 11 pages.
Examination Report issued Mar. 17, 2006, for GB Patent Application No. 0419933.7, 2 pages.
H. J. Sheen, W. J. Chen, and J. S. Wu, Flow Patterns for an Annular Flow Over an Axisymmetric Sudden Expansion, vol. 350, pp. 177-188, dated Jun. 16, 1997, 12 pages.
Pi Piezo & Nanopositioning Products, PI (Physik Instrumente), dated 1996-2004, 2 pages.
Pi Ceramic, Pica-Stack Piezoceramic Actuators Versatile Piezoelectric Power, undated, 2 pages.
Pi, Closed-Loop, High-Deflection PICMA Multilayer Piezo Bender Actuators, undated, 2 pages.
Halliburton, FloStream™ Venturi Flow Meter, abstract, dated 2010, 1 page.

* cited by examiner

ANNULUS VORTEX FLOWMETER

CROSS-REFERENCE TO RELATED APPLICATION

The present application claims the benefit under 35 USC §119 of the filing date of International Application No. PCT/US09/53128, filed Aug. 7, 2009. The entire disclosure of this prior application is incorporated herein by this reference.

BACKGROUND

This disclosure relates generally to equipment utilized and operations performed in conjunction with a subterranean well and, in an example described below, more particularly provides an annulus vortex flowmeter.

Downhole flowmeters for use in wells are generally relatively fragile, complex, expensive and/or obstructive to downhole operations. For example, it is known to interconnect a venturi-type flowmeter in a tubing string in order to measure the flow rate of fluid through the tubing string. However, the venturi of the flowmeter necessarily restricts flow and access through the tubing string, and such venturi flowmeters typically require use of multiple pressure sensors to measure pressure at corresponding multiple positions in the flowmeter.

Therefore, it will be appreciated that there is a need for improvements in the art of constructing flowmeters and utilizing flowmeters for measuring flow rate in conjunction with well operations. Such improved flowmeters and associated systems and methods could be useful in a wide range of production and injection operations.

SUMMARY

In the disclosure below, a flowmeter and associated well systems and methods are provided which bring improvements to the art of measuring a rate of fluid flow in conjunction with well operations. One example is described below in which the flowmeter does not obstruct a longitudinal flow passage through a tubular string used for production or injection in a well. Another example is described below in which the flowmeter uses a sensor to sense vibration of a structure due to vortices produced external to a housing.

In one aspect, a flowmeter for measuring a rate of fluid flow in a subterranean well is provided to the art by the present disclosure. The flowmeter includes a generally tubular housing, at least one vortex responsive structure which vibrates in response to vortices produced external to the housing, and at least one sensor which senses vibration of the structure and in response produces a signal indicative of the rate of fluid flow.

In another aspect, a well system is provided which includes a flowmeter which measures a rate of flow of fluid through an annulus external to a tubular string. The flowmeter includes at least one vortex shedding device, at least one vortex responsive structure which vibrates in response to vortices produced by the vortex shedding device, and at least one sensor which senses vibration of the structure and in response produces a signal indicative of the rate of flow of the fluid through the annulus.

In yet another aspect, a method of measuring a rate of flow of fluid between a tubular string and a zone intersected by a wellbore is provided which includes the steps of: utilizing a flowmeter which includes a vortex shedding device positioned external to a generally tubular housing adapted to be interconnected as part of the tubular string, the flowmeter further including a vortex responsive structure which vibrates in response to vortices produced by the vortex shedding device as the fluid flows through an annulus external to the housing, and a sensor which senses vibration of the structure and in response produces a signal indicative of the rate of flow of the fluid; and determining the rate of flow of the fluid in the annulus based on the signal produced by the sensor.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

Figure 1:
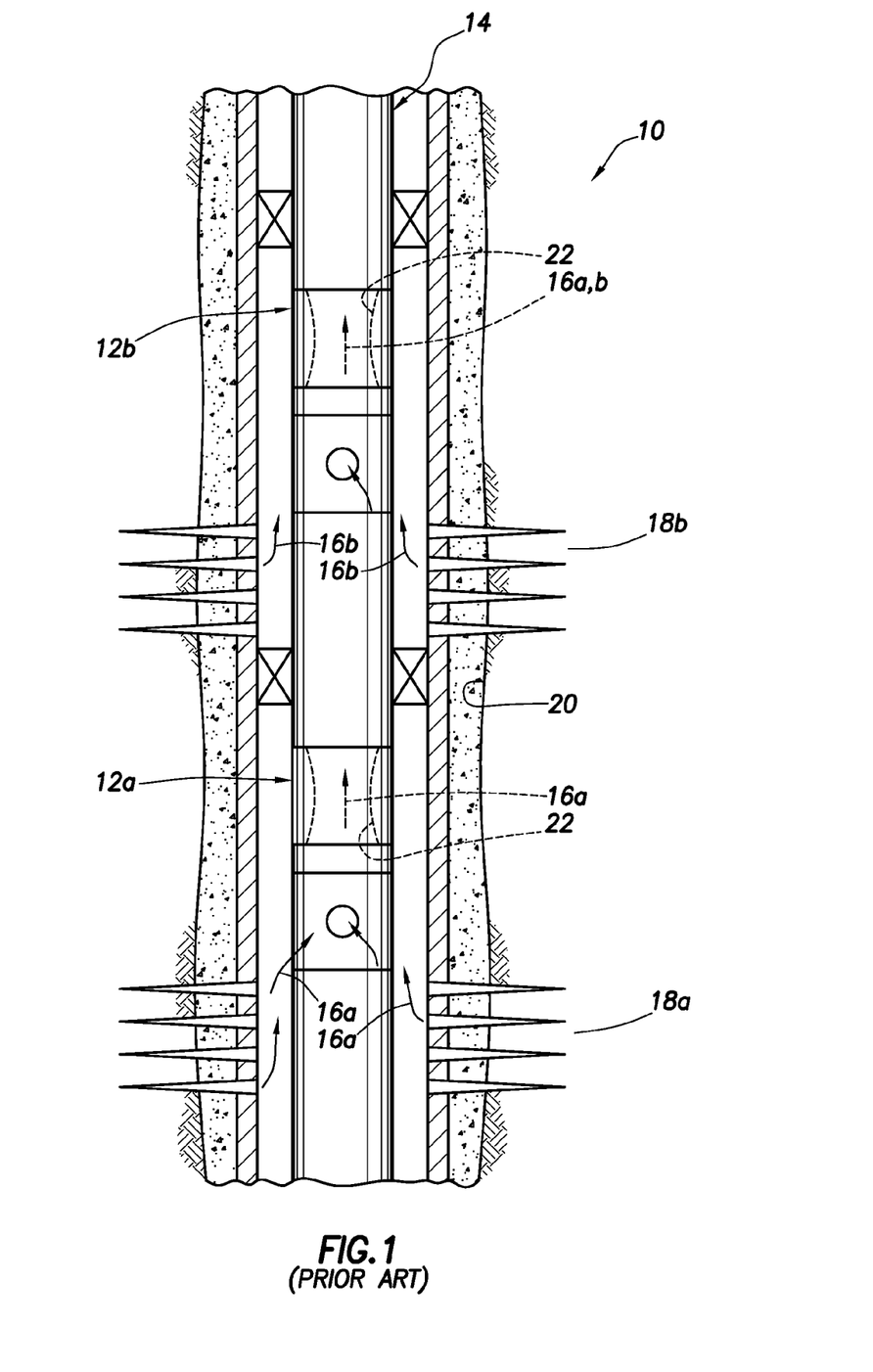
FIG. 1 is a schematic partially cross-sectional view of a prior art flow sensing system.

Representatively illustrated in FIG. 1 is a prior art flow sensing system 10. This illustration is not meant to imply that any particular prior art system exactly corresponds to the features shown in the drawing. Instead, FIG. 1 is intended to demonstrate some of the drawbacks of such prior art flow sensing systems.

In the system 10 depicted in FIG. 1, flowmeters 12a,b are interconnected in a tubing string 14 for measuring the flow rate of fluid 16a,b produced from respective multiple zones 18a,b intersected by a wellbore 20. The lower flowmeter 12a measures the flow rate of the fluid 16a produced from the lower zone 18a after it enters the tubing string 14. The upper flowmeter 12b measures the flow rate of the commingled fluids 16a,b produced from the upper and lower zones 18a,b and so the flow rate of the fluid 16a measured by the lower flowmeter 12a must be subtracted from the measured flow rate of the commingled fluids 16a,b to derive the flow rate of the fluid 16b produced from the upper zone 18b.

Each of the flowmeters 12a,b includes an internal venturi 22 for producing a pressure variation in the fluid flowing though the venturi. The pressure variation is related to the flow rate of the fluid. Multiple pressure sensors (not shown in FIG. 1) are typically used to measure the pressure of the fluid at different positions relative to the venturi 22.

Note that the venturis 22 restrict access through the tubing string 14 and restrict flow of fluid through the tubing string. These restrictions are problematic whether fluid is produced from the well or injected into the well. The use of multiple sensors in each flowmeter 12a,b also increases the chances that at least one of the sensors will fail, thereby preventing accurate measurement of flow rate by possibly multiple flowmeters (for example, if the flow rate of fluid 16a cannot be accurately measured, then the flow rate of the fluid 16b in the system 10 also cannot be accurately measured).

Figure 2:
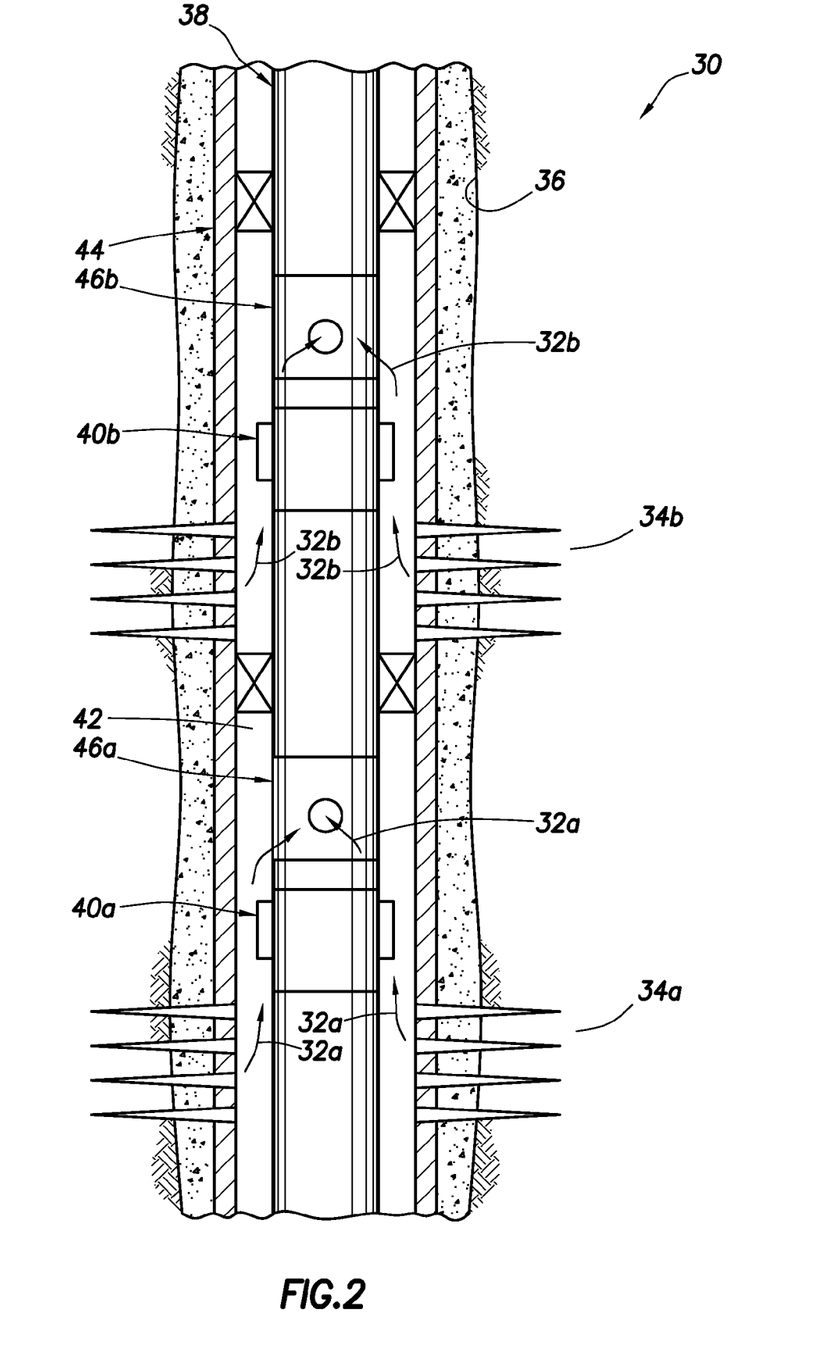
FIG. 2 is a schematic partially cross-sectional view of a well system and associated method which embody principles of the present disclosure.

Referring now to FIG. 2, a well system 30 which embodies principles of the present disclosure is representatively illustrated. The system 30 is described below in conjunction with production operations (i.e., with fluid 32a,b being produced from respective zones 34a,b intersected by a wellbore 36), but it should be understood that the system can also be used to inject fluid into the zones (for example, by reversing the flow of the fluids depicted in FIG. 2).

A tubular string 38 (such as a production tubing string, coiled tubing string, liner string, etc.) is positioned in the wellbore 36 and, as depicted in FIG. 2, is used for producing the fluid 32a,b to the surface. However, in injection operations the tubular string 38 could instead be used to flow the fluid 32a,b into the zones 34a,b.

Flowmeters 40a,b are interconnected in the tubular string 38. Each of the flowmeters 40a,b is used to measure the flow rate of the respective fluid 32a,b as it flows through an annulus 42 external to the tubular string 38.

As depicted in FIG. 2, the annulus 42 is radially between the tubular string 38 and a tubular casing string 44 lining the wellbore 36. However, in other examples, the wellbore 36 may not be lined with casing (e.g., an open wellbore), in which case the annulus 42 may be formed radially between the tubular string 38 and the wellbore 36.

The fluids 32a,b flow through the annulus 42 between the respective zones 34a,b and flow control devices 46a,b interconnected in the tubular string 38. The flow control devices 46a,b control flow of the respective fluids 32a,b into an interior flow passage 48 (not shown in FIG. 2, see FIG. 3) extending longitudinally through the tubular string 38. For example, the flow control devices 46a,b could be valves, chokes, inflow control devices, etc.

Thus, each of the flowmeters 40a,b measures the flow rate of the respective fluid 32a,b in the annulus 42 as it flows between the respective zone 34a,b and the interior flow passage 48 of the tubular string 38. In this manner, each flowmeter 40a,b is capable of independently measuring the flow rate of each respective fluid 32a,b without the need to compensate for fluid commingling, etc.

Important advantages of the flowmeters 40a,b include the fact that they do not restrict access through the interior of the tubular string 38, and they do not restrict flow through the tubular string. Further details of the construction of a flowmeter example are described below.

Figure 3:
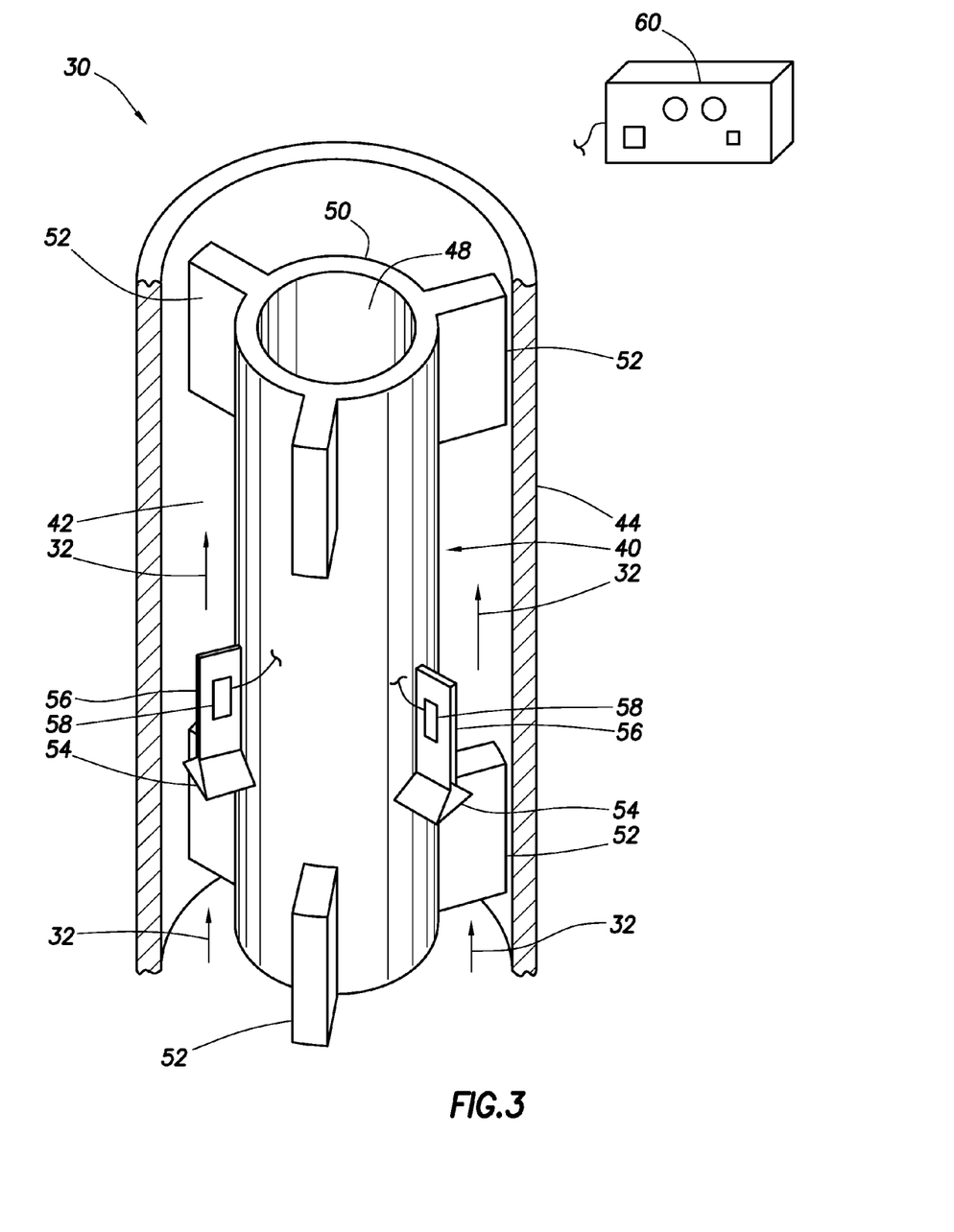
FIG. 3 is an enlarged scale schematic isometric view of a flowmeter which may be used in the well system of FIG. 2.

Referring additionally now to FIG. 3, an enlarged scale view of a flowmeter 40 which may be used for either of the flowmeters 40a,b in the system 30 is representatively illustrated. In this view it may be seen that the flowmeter 40 includes a generally tubular housing 50 having centralizers 52 thereon for spacing the housing radially apart from the casing string 44 (or wellbore 36 if it is uncased).

In this manner, the annulus 42 preferably extends circumferentially about the housing 50 with a more or less consistent radial width. Various different types of centralizers may be used to achieve various different degrees of consistency in the radial width of the annulus 42.

The flowmeter 40 also includes three sets of a vortex shedding device 54, a vortex responsive structure 56 and a vibration sensor 58, although only two sets are visible in FIG. 3. The sets are preferably equally spaced apart circumferentially about the housing 50. However, it should be clearly understood that any number of the sets (including one) and any spacings of the sets may be used in keeping with the principles of this disclosure.

As the fluid 32 (which could be either of the fluids 32a,b in the system 30 described above) flows through the annulus 42, the device 54 causes vortices to be formed in the flow. The structure 56 vibrates in response to these vortices, and the sensor 58 senses the vibration as an indication of the flow rate of the fluid 32.

For example, the structure 56 may vibrate with greater amplitude and/or greater frequency in response to greater flow rate of the fluid 32. Thus, using a calibration procedure, the vibration of the structure 56 as sensed by the sensor 58 can be conveniently correlated to the flow rate of the fluid 32 through the annulus 42.

A computing device 60 in communication with the sensors 58 (e.g., via hard wiring, various forms of telemetry, etc.) may be used for determining the flow rate of the fluid 32 based on signals received from the sensors 58 indicative of vibration of the structures 56. The computing device 60 could be positioned at any location including, for example, at the surface, downhole, etc.

Figure 4:
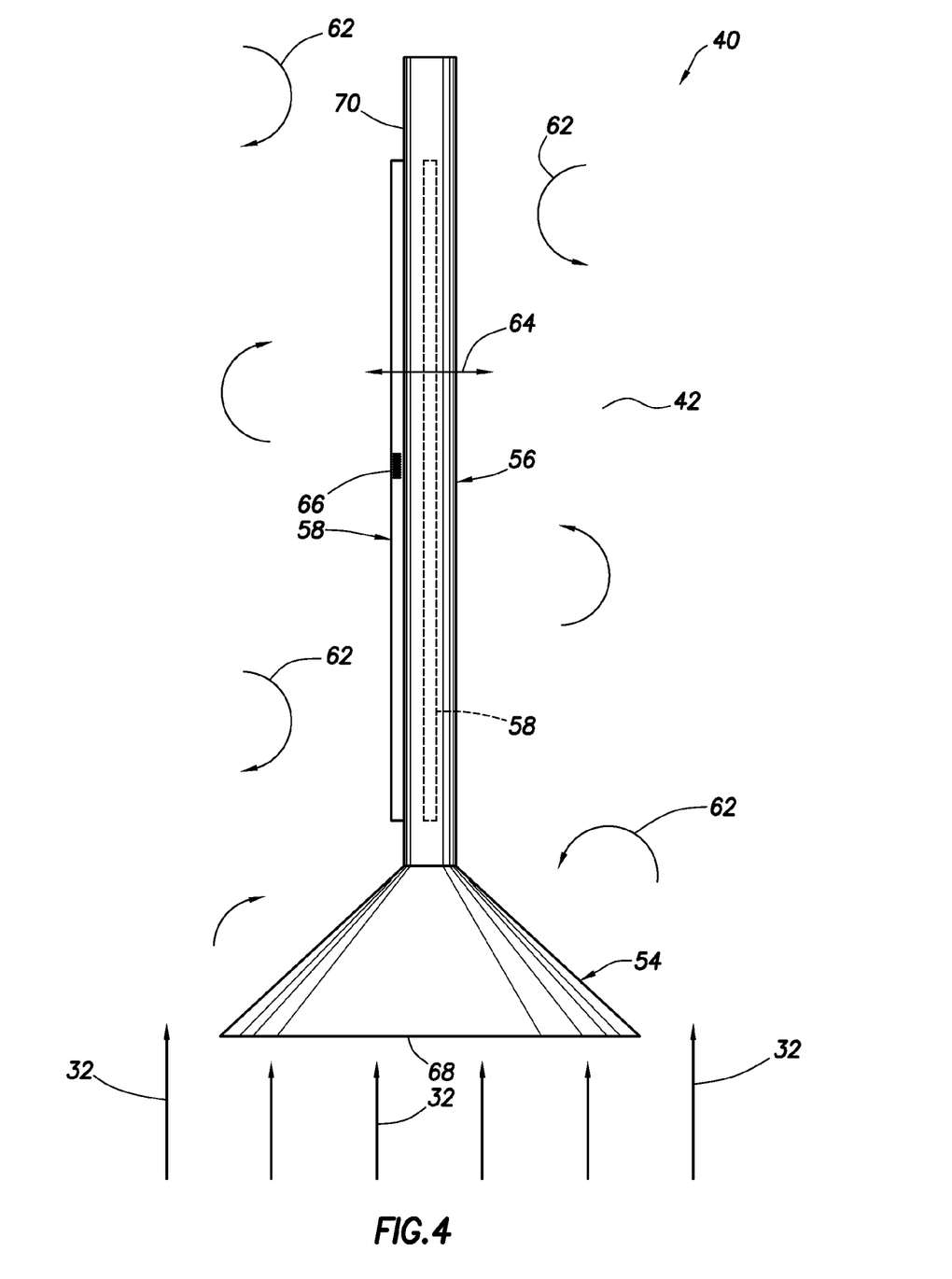
FIG. 4 is a further enlarged scale schematic view of certain elements of the flowmeter.

Referring additionally now to FIG. 4, an enlarged scale plan view of one of the sets of vortex shedding device 54, vortex responsive structure 56 and vibration sensor 58 is representatively illustrated, apart from the remainder of the flowmeter 40 and the system 30. In this view it may be seen that the device 54 produces vortices 62 in the flow of the fluid 32.

In the example of FIG. 4, the vortices 62 extend along opposite sides of the generally planar structure 56, thereby producing fluctuating pressure differentials across the structure. As a result, the structure 56 vibrates back and forth as indicated by the arrow 64. As depicted in FIG. 4, the structure 56 is in the form of a generally thin, flexible, elongated planar member 70, but other types of structures may be used, if desired.

The vibration 64 of the structure 56 is sensed by the sensor 58 which produces a signal indicative of the vibration. For example, the sensor 58 may be a strain sensor (such as an electric resistance strain gauge or an optical interferometric strain gauge which includes one or more Bragg gratings 66, etc.) for sensing strain in the structure 56.

The sensor 58 could alternatively, or in addition, comprise a displacement sensor, an accelerometer, or any other type of sensor capable of sensing the vibration 64 of the structure 56. As depicted in FIG. 4, the sensor 58 could be positioned external or internal to the structure 56.

The device 54 which produces the vortices 62 is shown in FIG. 4 as being in the form of a bluff body 68 which presents a generally planar face to the flow of the fluid 32. However, other types of vortex shedding devices (such as ramps, etc.) may be used in keeping with the principles of this disclosure.

It may now be fully appreciated that this disclosure provides several improvements to the art of sensing flow rate in conjunction with well operations. The flowmeter 40 described above does not obstruct flow or access through its housing 50 or any tubular string in which it is connected, and the sensing of flow rate may be performed through use of a single robust vibration sensor 58, although other numbers of vibration sensors may be used, if desired.

The above disclosure describes a well system 30 which includes a flowmeter 40 which measures a rate of flow of fluid 32 through an annulus 42 external to a tubular string 38. The flowmeter 40 includes at least one vortex shedding device 54, at least one vortex responsive structure 56 which vibrates in response to vortices 62 produced by the vortex shedding device 54, and at least one sensor 58 which senses vibration of the structure 56 and in response produces a signal indicative of the rate of flow of the fluid 32 through the annulus 42.

The fluid 32 may flow into an interior of the tubular string 38 after flowing across the flowmeter 40.

The vortex shedding device 54 may include a bluff body 68. The vortex responsive structure 56 may include a flexible member 70 which displaces in response to pressure differentials produced by the vortices 62.

The sensor 58 may sense strain in the vortex responsive structure 56. The sensor 58 may include an optical Bragg grating 66. The sensor 58 may sense displacement of the vortex responsive structure 56.

The flowmeter 40 may include multiple sets of the vortex shedding device 54, vortex responsive structure 56 and sensor 58. The sets may be distributed circumferentially about the tubular string 38.

The above disclosure also describes a method of measuring a rate of flow of fluid 32 between a tubular string 38 and a zone 34a,b intersected by a wellbore 36. The method includes the steps of: utilizing a flowmeter 40 which includes a vortex shedding device 54 positioned external to a generally tubular housing 50 adapted to be interconnected as part of the tubular string 38, the flowmeter 40 further including a vortex responsive structure 56 which vibrates in response to vortices 62 produced by the vortex shedding device 54 as the fluid 32 flows through an annulus 42 external to the housing 50, and a sensor 58 which senses vibration 64 of the structure 56 and in response produces a signal indicative of the rate of flow of the fluid 32; and determining the rate of flow of the fluid 32 in the annulus 42 based on the signal produced by the sensor 58.

The fluid 32 may flow across the flowmeter 40 prior to flowing into an interior of the tubular string 38.

Also described by the above disclosure is a flowmeter 40 for measuring a rate of fluid flow in a subterranean well. The flowmeter 40 includes a generally tubular housing 50, at least one vortex responsive structure 56 which vibrates in response to vortices 62 produced external to the housing 50, and at least one sensor 58 which senses vibration 64 of the structure 56 and in response produces a signal indicative of the rate of fluid flow.

The flowmeter 40 may also include at least one vortex shedding device 54 positioned external to the housing 50. The vortex shedding device 54 may produce the vortices 62 in fluid 32 which flows external to the housing 50. The vortex shedding device 54 may comprise a bluff body 68.

The flowmeter 40 may comprise multiple sets of the vortex responsive structure 56 and sensor 58. The sets may be distributed circumferentially about the tubular string 38.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

In the above description of the representative examples of the disclosure, directional terms, such as "above," "below," "upper," "lower," etc., are used for convenience in referring to the accompanying drawings. In general, "above," "upper," "upward" and similar terms refer to a direction toward the earth's surface along a wellbore, and "below," "lower," "downward" and similar terms refer to a direction away from the earth's surface along the wellbore.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A well system, comprising:
    a flowmeter which measures, within an annulus external to a tubular string, a rate of flow of fluid through the annulus,
    the flowmeter including:
    at least one vortex shedding device,
    at least one vortex responsive structure which vibrates in response to vortices produced by the vortex shedding device, and
    at least one sensor which senses vibration of the structure and in response produces a signal indicative of the rate of flow of the fluid through the annulus.

2. The well system of claim 1, wherein the fluid flows into an interior of the tubular string after flowing across the flowmeter.

3. The well system of claim 1, wherein the vortex shedding device comprises a bluff body.

4. The well system of claim 1, wherein the vortex responsive structure comprises a flexible member which displaces in response to pressure differentials produced by the vortices.

5. The well system of claim 1, wherein the sensor senses strain in the vortex responsive structure.

6. The well system of claim 1, wherein the sensor comprises an optical Bragg grating.

7. The well system of claim 1, wherein the sensor senses displacement of the vortex responsive structure.

8. The well system of claim 1, wherein the flowmeter comprises multiple sets of the vortex shedding device, vortex responsive structure and sensor, and wherein the sets are distributed circumferentially about the tubular string.

9. A method of measuring a rate of flow of fluid between a tubular string and a zone intersected by a wellbore, the method comprising the steps of:
    utilizing a flowmeter which includes a generally tublar housing and a vortex shedding device positioned external to the housing, the flowmeter further including a vortex responsive structure which vibrates in response to vortices produced by the vortex shedding device as the fluid flows through an annulus external to the housing, and a sensor which senses vibration of the structure and in response produces a signal indicative of the rate of flow of the fluid; and
    determining the rate of flow of the fluid in the annulus based on the signal produced by the sensor.

10. The method of claim 9, wherein the fluid flows across the flowmeter prior to flowing into an interior of the tubular string.

11. The method of claim 9, wherein the vortex shedding device comprises a bluff body which produces the vortices in the annulus.

12. The method of claim 9, wherein the vortex responsive structure comprises a flexible member which displaces in response to pressure differentials produced by the vortices.

13. The method of claim 9, wherein the sensor senses strain in the vortex responsive structure.

14. The method of claim 9, wherein the sensor comprises an optical Bragg grating.

15. The method of claim 9, wherein the sensor senses displacement of the vortex responsive structure.

16. The method of claim 9, wherein the flowmeter comprises multiple sets of the vortex shedding device, vortex responsive structure and sensor, and wherein the sets are distributed circumferentially about the tubular string.

17. A flowmeter for measuring a rate of fluid flow in a subterranean well, the flowmeter comprising:
- a generally tubular housing having an unobstructed central flow passage;
- at least one vortex responsive structure which vibrates in response to vortices produced external to the housing; and
- at least one sensor which senses vibration of the structure and in response produces a signal indicative of the rate of fluid flow.

18. The flowmeter of claim 17, further comprising at least one vortex shedding device positioned external to the housing, and which produces the vortices in fluid which flows external to the housing.

19. The flowmeter of claim 18, wherein the vortex shedding device comprises a bluff body.

20. The flowmeter of claim 17, wherein the vortex responsive structure comprises a flexible member which displaces in response to pressure differentials produced by the vortices.

21. The flowmeter of claim 17, wherein the sensor senses strain in the vortex responsive structure.

22. The flowmeter of claim 17, wherein the sensor comprises an optical Bragg grating.

23. The flowmeter of claim 17, wherein the sensor senses displacement of the vortex responsive structure.

24. The flowmeter of claim 17, wherein the flowmeter comprises multiple sets of the vortex responsive structure and sensor, and wherein the sets are distributed circumferentially about the tubular string.

* * * * *

UNITED STATES PATENT AND TRADEMARK OFFICE
CERTIFICATE OF CORRECTION

| | | |
|---|---|---|
| PATENT NO. | : 8,234,932 B2 | Page 1 of 1 |
| APPLICATION NO. | : 12/839463 | |
| DATED | : August 7, 2012 | |
| INVENTOR(S) | : Timothy R. Tips | |

It is certified that error appears in the above-identified patent and that said Letters Patent is hereby corrected as shown below:

Title page, in a new item 30, "Foreign Application Priority Data" section,
insert -- 7 August 2009 (WO) ............ PCT/US09/53128 --.

Signed and Sealed this
Twenty-third Day of October, 2012

David J. Kappos
*Director of the United States Patent and Trademark Office*